United States Patent [19]

Abe et al.

[11] Patent Number: 5,202,547
[45] Date of Patent: Apr. 13, 1993

[54] RESISTANCE ADJUSTING TYPE HEATER

[75] Inventors: Fumio Abe, Handa; Hiroshige Mizuno, Tajimi; Takashi Harada, Nagoya; Tomoharu Kondo, Toki, all of Japan

[73] Assignee: NGK Insulators, Ltd., Japan

[21] Appl. No.: 842,964

[22] Filed: Feb. 28, 1992

[30] Foreign Application Priority Data

Mar. 5, 1991 [JP] Japan ................... 3-063943

[51] Int. Cl.$^5$ ............ H05B 3/10; F01N 3/10; B01D 53/36
[52] U.S. Cl. .................... 219/552; 219/205; 392/488; 428/116; 60/300; 422/174; 55/DIG. 30
[58] Field of Search ............ 392/502, 347, 379, 485, 392/486, 488, 490; 219/542, 541, 552, 553; 422/174, 175, 177, 179, 180; 502/527, 439; 60/300; 423/212 C, 239; 428/116

[56] References Cited

U.S. PATENT DOCUMENTS 4,717,813 1/1988 Berg et al. ................. 219/541
5,063,029 11/1991 Mizuno et al. ............. 422/175

FOREIGN PATENT DOCUMENTS

| 0283220 | 9/1988 | European Pat. Off. |
| 58-23138 | 11/1975 | Japan |
| 63-67609 | 2/1986 | Japan |
| 1492929 | 6/1974 | United Kingdom |
| 89/10471 | 3/1989 | World Int. Prop. O. |

Primary Examiner—Bruce A. Reynolds
Assistant Examiner—Michael D. Switzer
Attorney, Agent, or Firm—Parkhurst, Wendel & Rossi

[57] ABSTRACT

A resistance adjusting type heater has a honeycomb structure having a large number of passages, at least two electrodes to enable electrical heating of the honeycomb structure provided on the honeycomb structure, and a resistance adjusting means, a slit, provided between the electrodes. The thicknesses of passage walls at the portions of the honeycomb structure at which electricity flows at a very high density are increased with a conductive material to prevent the abnormal heat generation at the portions of the honeycomb structure.

4 Claims, 5 Drawing Sheets

ARROW: CURRENT FLOW

ARROW: CURRENT FLOW

ARROW: CURRENT FLOW

RESISTANCE ADJUSTING TYPE HEATER

BACKGROUND OF THE INVENTION

1. Field of the Invention

The present invention relates to a heater having a resistance-adjusting function and employing a honeycomb structure.

Honeycomb heaters of the above-described type can be employed as heaters for domestic use, such as hot-air heater, or as industrial heaters, such as preheaters used for control of automobile exhaust emissions.

2. Description of the Prior Art

These days, besides porous ceramic honeycomb structures conventionally employed, metal honeycomb structures are drawing attention as catalysts or catalyst carriers for removing nitrogen oxide, carbon monoxide and hydrocarbons present in the exhaust gas of internal combustion engines, such as from automobiles.

As restriction of exhaust emission has been intensified, there has been a demand for development of heaters for use in reducing automobile exhaust emission when the temperature of the catalyst is not sufficiently high, i.e., at the beginning of running of a vehicle.

Honeycomb structures have been proposed in, for example, U.K. Patent 1492929 and Japanese Utility Model Laid-Open No. 67609/1988.

U.K. Patent 1492929 discloses the use of foil-type metal honeycomb structure in a catalyst for use in automobile exhaust emission control. This honeycomb structure comprises a metal substrate produced by winding a flat plate with, a mechanically deformed, corrugated plate. This metal substrate has an aluminum oxide film formed on the surface thereof by the oxidation process. The catalyst for use in automobile exhaust emission control is manufactured by placing a large surface area oxide, such as alumina, on the aluminum oxide film of the metal substrate and by impregnating a noble metal on the large surface area oxide.

Japanese Utility Model Laid-Open No. 67609/1988 discloses an electrically conductive metal monolith catalyst comprising a metal support and alumina coated thereon, for use as a preheater.

In the foil-type metal honeycomb structure disclosed in U.K. Patent 1492929, however, the metal substrate with a coating formed thereon cannot be closely adhered to a catalyst layer because of its low porosity, and a ceramic catalyst readily peels off the metal substrate due to a difference in the thermal expansion between the ceramic catalyst and the metal substrate. Furthermore, telescope phenomenon readily occurs during the run cycle in which a metal-to-metal join breaks and the metal substrate is deformed in such a manner that it protrudes in the direction of the flow of gas. This may disturb safe running of the vehicle. Furthermore, in the manufacture of the foil-type metal honeycomb, yield of the rolling process is low, inviting high production cost. In the preheater proposed in Japanese utility Model Laid-Open No. 67609/1988, a catalyst readily peels off due to a difference in thermal expansion between alumina and the metal support. Furthermore, a metal-to-metal join of the metal substrate breaks during the operation, generating an electrically insulating portion and, hence, non-uniform flow of current and non-uniform heating.

The preheater disclosed in Japanese utility Model Laid-Open No. 67609/1988 is constructed so that a current is supplied between the inner periphery and the outer periphery of the foil-type metal honeycomb structure to generate heat. However, the preheater is not arranged so that it has an adjusted resistance (that is, only the material, dimension and rib thickness of the honeycomb structure are fixed but a desired resistance cannot be adjusted), and therefore, exhibits insufficient raising-temperature characteristic. Furthermore, since the electrodes are provided on the inner peripheral portion of the preheater, the central portion thereof does not act as a catalyst and pressure loss may be generated. Furthermore, the electrodes readily break due to the flow of gas.

SUMMARY OF THE INVENTION

Accordingly, an object of the present invention is to provide a resistance adjusting type heater which eliminates the aforementioned problems of the prior techniques.

According to the present invention, there is provided a resistance adjusting type heater comprising a honeycomb structure having a large number of passages, at least two electrodes for enabling electrical heating of the honeycomb structure, provided on the honeycomb structure, and a resistance adjusting means provided between the electrodes, wherein the thicknesses of passage walls at the portions of the honeycomb structure at which electricity flows at a very high density are increased with a conductive material to prevent abnormal heat generation at these portions of the honeycomb structure.

The invention also provides a resistance adjusting type heater comprising a honeycomb structure having a large number of passages, at least two electrodes for enabling electrical heating of the honeycomb structure, provided on the honeycomb structure, and a resistance adjusting means provided between the electrodes, wherein the passages at the portions of the honeycomb structure at which electricity flows at a very high density are filled with a conductive material to prevent the abnormal heat generation at these portions of the honeycomb structure.

In the present invention, it is preferable to use a slit or slits as the resistance adjusting means.

DETAILED DESCRIPTION OF THE INVENTION

The present invention resides in a resistance adjusting type heater comprising a honeycomb structure having a large number of passages, electrodes provided on the honeycomb structure, and a resistance adjusting means (e.g. slits) provided between the electrodes, in which abnormal heat generation at the portions of the honeycomb structure at which electricity flows at a very high density is prevented.

The honeycomb structure of the resistance adjusting type heater of the present invention is preferably produced by molding powder materials into a honeycomb shape and then sintering the shape. In this case, the use of so-called powder metallurgy and extrusion is preferable because it is relatively simple and economical.

The heater of the present invention is preferably produced in the form of a honeycomb structure (a monolithic structure) using powder materials, because such a structure gives no telescope phenomenon and can achieve uniform heat generation.

Figure 8:
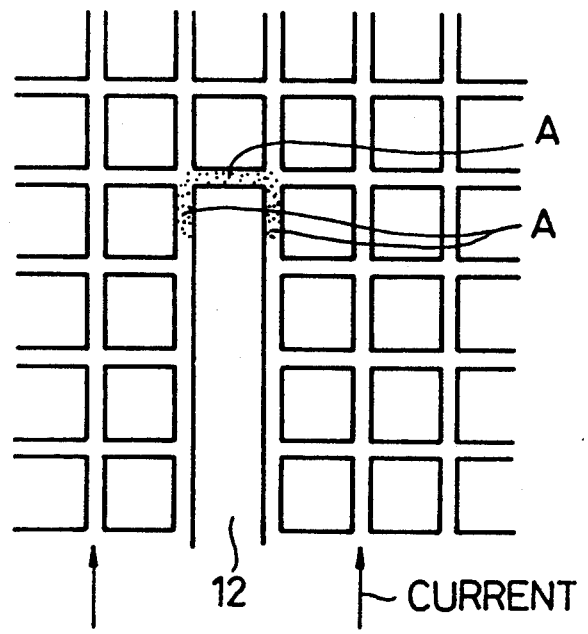
FIG. 8 is a fragmentary enlarged view showing an example of the front end of a slit in a resistance adjusting type heater wherein all the passage walls have the same thickness.
Figure 9:
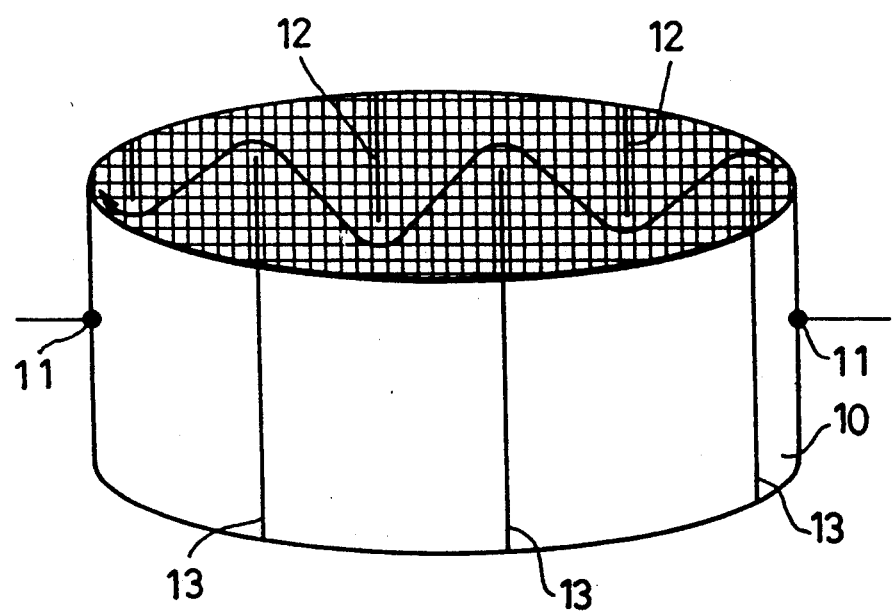
FIG. 9 is a perspective view of a resistance adjusting type heater.

Ordinarily in the resistance adjusting type heater of the present invention, the passages of the honeycomb structure have a square cross-section and the passage walls have substantially the same thickness, as shown in FIG. 8. In such an arrangement, however, it was found that when the honeycomb structure is electrified, electricity flows at a very high density at the front end A of the slit (resistance adjusting means) as shown in FIGS. 8 and 9, allowing the portion A to be abnormally heated. As a result, the catalyst supported on the honeycomb structure is deactivated, the base material of the honeycomb structure is oxidized, and there may arise after a period of use, decreased durability caused by cracking, etc.

Hence, the present invention solves the above problems by increasing the thicknesses of passage walls at the portions of the honeycomb structure at which electricity flows at a very high density when the structure is electrified, or by filling the passages at these portions of the honeycomb structure with a conductive material to prevent the abnormal heat generation at these portions of the honeycomb structure.

The means employed in the present invention for preventing the abnormal heat generation at the portions of the honeycomb structure at which electricity flows at a very high density, is described below with reference to drawings.

Figure 1:
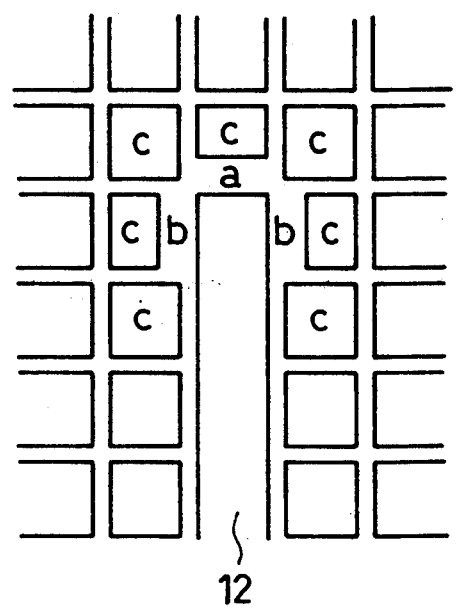
FIG. 1 is a fragmentary enlarged view showing an example of the front end of slit in the resistance adjusting type heater of the present invention.

FIG. 1 shows a resistance adjusting type heater of passage wall thickness-increased type according to the present invention. In this type heater, it is absolutely necessary to make thicker the passage wall "a" at the front end of each slit 12 because electricity flows through this passage wall at the highest density. It is preferable to make thicker also the passage walls "b" as shown in FIG. 1 because electricity flows through these passage walls at a relatively high density.

It is also preferable to make thicker even the passage walls which define passages "c" present in the vicinity of the front end of each slit 12, in order to more adequately prevent abnormal heat generation.

In the above case, the thickness t of thickness-increased passage walls is preferably $\frac{1}{2} \times n t_0$ or more wherein n is the number of passage walls (ribs) between two adjacent slits and $t_0$ is the thickness of the passage walls having non-increased thickness.

In producing a honeycomb structure of passage wall thickness-increased type by, for example, powder metallurgy and extrusion, a die is appropriately adjusted in advance so as to allow the extrudate to have an increased wall thickness at the desired portions. In this case, the thickness-increased passage wall portions have a given wall thickness t and extend over the entire length of passage from the gas inlet to the gas outlet.

In producing a honeycomb structure of passage wall thickness-increased type by injection molding, press molding, slip casting or coating, the thickness-increased wall portions having a given wall thickness t need not necessarily extend over the entire length of passage from the gas inlet to the gas outlet. However, it is preferable that the thickness-increased wall portions having a given thickness t extend over the entire passage length.

Meanwhile, it may be desirable to make the slits of honeycomb structure longer while maintaining the mechanical strength of the structure, in order to increase the heat-generating area of the structure. To meet such a request, the slits may extend to the outer periphery of the honeycomb structure. In such a case, the wall thickness of the outer periphery is increased to prevent abnormal heat generation at the outer periphery caused by very high current density.

In increasing the wall thickness of the outer periphery of the honeycomb structure, a die is appropriately adjusted in advance before extrusion to form a honeycomb structure whose outer periphery has an increased thickness, or a conductive material is strongly bonded to the outer periphery wall of a dried or sintered honeycomb structure. The latter approach is preferably carried out by winding, around a dried or sintered honeycomb structure, a plate made of the same materials as those of the honeycomb structure and then strongly bonding them in a firing step.

Figure 2:
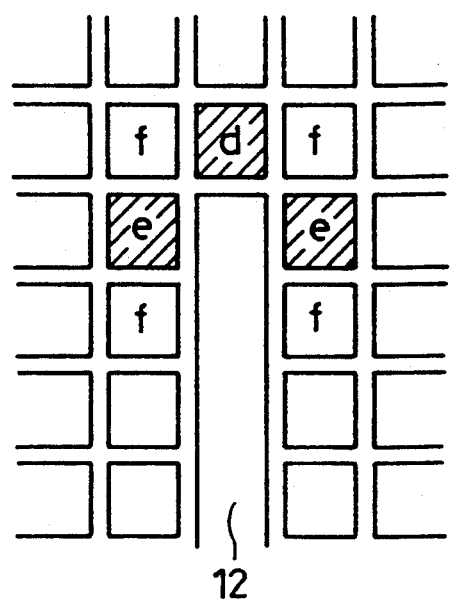
FIG. 2 is a fragmentary enlarged view showing another example of the front end of slit in the resistance adjusting type heater of the present invention.

FIG. 2 shows a resistance adjusting type heater of passage-filled type according to the present invention. In this type heater, the passage "d" at each portion of the honeycomb structure at which electricity flows at a very high density, preferably even the passages "e", more preferably even the passages "f" are filled with a conductive material. Specifically, a die may be appropriately adjusted at the time of extrusion to obtain a honeycomb structure in which said passages are blocked, or a dried or sintered honeycomb structure may be filled at said passages with a conductive material by injection molding, press molding, slip casting, coating or the like. In such a case, it is not necessary to fill all of the passages "d", "e" and "f" over the entire length of the honeycomb structure from the gas inlet to the gas outlet, but it is preferable to fill all of them.

Figure 3:
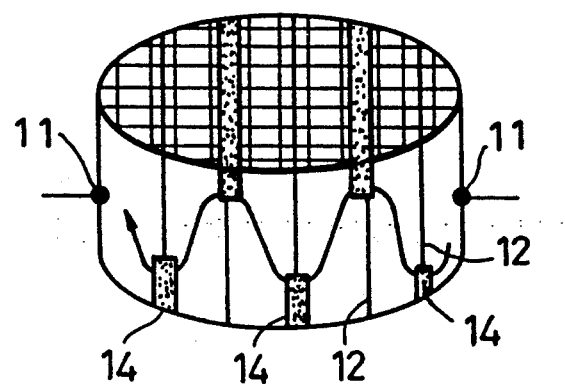
FIG. 3 is a perspective view showing an example of the resistance adjusting type heater of the present invention.
Figure 4:
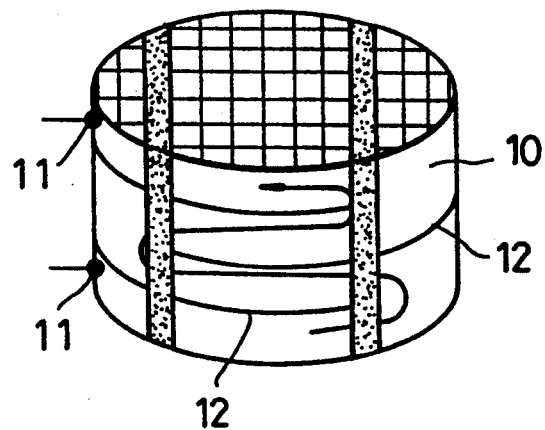
FIG. 4 is a perspective view showing another example of the resistance adjusting type heater of the present invention.

FIGS. 3 and 4 each show an example of the resistance adjusting type heater according to the present invention, wherein the portions of the honeycomb structure at which the direction of electric current is bent, are filled. Specifically, FIG. 3 is a resistance adjusting type heater in which slits 12 are formed in the same direction as that of passage axis, and FIG. 4 is a resistance adjusting type heater in which slits 12 are formed at a right angle to the direction of passage axis. In these heaters, the portions at which the direction of electric current is bent, are filled. In the heater of FIG. 3, not only abnormal heat generation but also gas blowing through slits are prevented, whereby improved exhaust gas purification is attained.

Figure 5:
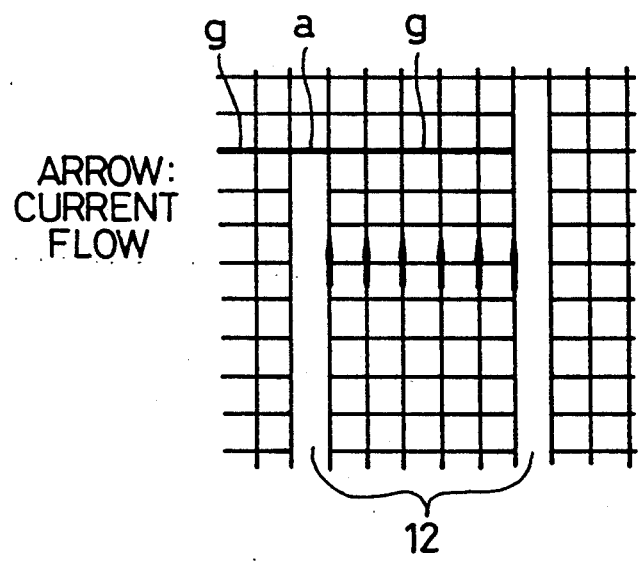
FIG. 5 is a fragmentary enlarged view showing still another example of the front end of a slit in the resistance adjusting type heater of the present invention.
Figure 6:
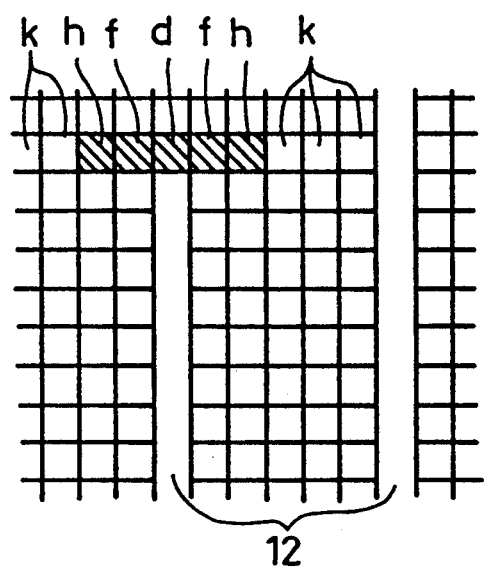
FIG. 6 is a fragmentary enlarged view showing still another example of the front end of a slit in the resistance adjusting type heater of the present invention.
Figure 7:
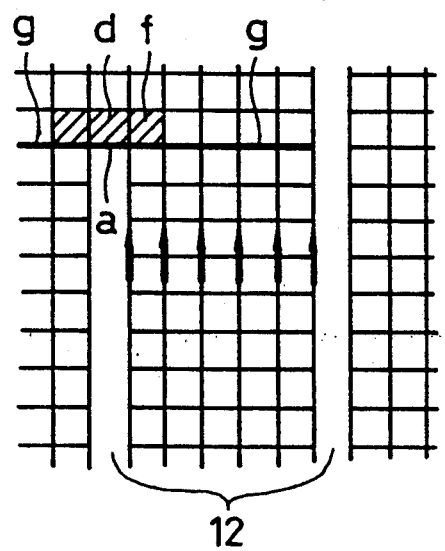
FIG. 7 is a fragmentary enlarged view showing still another example of the front end of a slit in the resistance adjusting type heater of the present invention.

FIG. 5 is other example of the heater of passage wall thickness-increased type. In this heater, not only the passage wall "a" at each heater portion at which electricity flows at a very high density, but also the passage walls "g" contiguous to "a" and extending as far as the nearest two slits 12 have an increased thickness. FIG. 6 is another example of the heater of passage-filled type. In this heater, not only the passage "d" at each heater portion at which electricity flows at a very high density, but also the passages "f" contiguous to "d" and the passages "h" contiguous to "f" are filled. Further, the passages "k" contiguous to "h" and extending as far as the nearest two slits 12 may be filled. FIG. 7 is a combination of FIGS. 5 and 6.

In the heaters shown in FIGS. 5 to 7, electricity flows relatively evenly through each rib between slits, and such flow of electricity is preferable.

The material used for increase of passage wall thickness and the material used for passage filling have no particular restrictions as long as they are a conductive material, but are preferably the same as the materials for passage wall in view of productivity and adhesion to passage walls.

In the resistance adjusting type heater of the present invention, the passage walls and pores of the metallic honeycomb structure are preferably coated with a heat-resistant metal oxide such as $Al_2O_3$, $Cr_2O_3$ or the like for improved heat resistance, oxidation resistance and corrosion resistance.

Whereas any material, ceramic or metal, capable of generating heat when energized can be used as the material of the honeycomb structure which is the basic body of the present invention, the use of metals enhances the mechanical strength. Examples of such metals include stainless steel and those having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of their low cost and high resistance to heat, oxidation and corrosion. Foil-type metal honeycomb structures may also be employed.

The honeycomb structure employed in the present invention may be porous or may not be porous. In the case where a catalyst is carried on the honeycomb structure, however, a porous honeycomb structure is preferred because it is closely adhered to a catalyst layer and does not cause peeling due to a difference in the thermal expansion between the honeycomb structure and the catalyst. Even if a nonporous honeycomb structure is employed, since the heater of this invention has a resistance-adjusting means which may be a slit, a thermal stress can be reduced and the possibility of crack occurrence can be decreased.

The method of manufacturing the metal honeycomb structure which can be employed in the present invention will now be exemplified.

First, Fe powder, Al powder and Cr powder, or alternatively powder of alloys of these metals, are mixed to prepare a metal powder material having a desired composition. Subsequently, the metal powder material is blended with an organic binder, such as methyl cellulose or polyvinylalcohol, and water to produce a readily formable mixture, and that mixture is then formed into a shape of a desired honeycomb configuration by extrusion.

When the metal powder material is blended with an organic binder and water, prior to the addition of water, an antioxidant, such as oleic acid, may be added to the metal powder material. Alternatively, metal powder which has been subjected to anti-oxidation process may be employed.

Next, the shaped honeycomb body is fired in a nonoxidizing atmosphere at a temperature between 1000° and 1400° C. During firing in the non-oxidizing atmosphere containing hydrogen, the organic binder is decomposed and thereby removed with the aid of Fe or the like which acts as a catalyst, and a good sintered body can therefore be obtained.

Sintering at a temperature lower than 1000° C. achieves no sintering. Sintering conducted at a temperature higher than 1400° C. causes deformation of the resulting sintered body.

Preferably, a heat-resistant metal oxide is then coated on the surface of the partition walls and that of the pores of the obtained sintered body by any of the following methods.

(1) the metal honeycomb structure (the sintered body) is subjected to heat-treatment in an oxidizing atmosphere at a temperature between 700° to 1200° C.

(2) Al or the like is plated (e.g., vapor plating) on the surface of the partition walls and that of the pores of the sintered body and the sintered body is then subjected to heat-treatment in an oxidizing atmosphere at a temperature between 700° and 1200° C.

(3) the sintered body is dipped into a molten metal, such as Al, and is then subjected to the heat-treatment in an oxidizing atmosphere at a temperature between 700° and 1200° C.

(4) alumina sol or the like is coated on the surface of the partition walls and that of the pores of the sintered body and that sintered body is then subjected to heat-treatment in an oxidizing atmosphere at a temperature between 700° and 1200° C.

To enhance resistance to heat and oxidation, heat-treatment conducted at a temperature between 900° and 1150° C. is preferred.

Next, on the obtained honeycomb structure, slits are provided in various forms between the electrodes thereof, which will be described later. Providing slits may be conducted immediately after drying or forming as well as after firing as stated above.

The resistance-adjusting-type heater of the present invention is produced by providing electrodes on the outer periphery of or inside the metal honeycomb structure obtained in the manner described above by means of brazing or welding.

The resistance of the metal honeycomb structure will be preferably held between $0.001\Omega$ and $0.5\Omega$.

Also, a heater can be produced by placing a catalyst on the surface of the obtained metal honeycomb structure. In such heater, heat is generated due to reaction (oxidation) of the exhaust gas.

The catalyst supported on the surface of the metal honeycomb structure is made of a carrier having a large surface area and a catalytic-activating material supported on the carrier. Typical examples of the carriers having a large surface area include the types of $Al_2O_3$, $TiO_2$, $SiO_2-Al_2O_3$ and perovskite. Examples of the catalytic-activating material include noble metals, such as Pt, Pd and Rh, and base metals, such as Cu, Ni, Cr and Co. The preferred catalyst 10 to 100 g/ft$^3$ noble metal loading on a carrier made of $\gamma$-$Al_2O_3$.

Whereas the honeycomb structure employed in the present invention may have any configuration, it is desirable that the cell density ranges from 6 to 1500 cells/in$^2$ (0.9 to 233 cells/cm$^2$) with a wall thickness ranging from 50 to 2000 μm.

As stated above, the honeycomb structure employed in the present invention may be porous or may not be porous and may have any porosity. However, to achieve sufficient mechanical strength and resistance to oxidation and corrosion, the porosity of the metal honeycomb structure will preferably be held between 0 and 50% by volume with most preferably porosity being less than 25% by volume. In the case of a honeycomb structure designed to carry a catalyst thereon, the porosity will be held 5% or above to ensure strong adhesion between the honeycomb structure and the catalyst layers.

The term, "honeycomb structure" is employed in this application to refer to an integral body having a large number of passages partitioned by walls. The outer shape of the honeycomb structure may be rectangular or elliptical as well as cylindrical. The passages may have any cross-sectional form (cell shape), e.g., a circular, polygonal or corrugated form.

The present invention is hereinafter described in more detail with reference to Examples. However, the present invention is by no means restricted to these Examples.

EXAMPLE 1

Raw materials, i.e. a Fe powder, a Fe-Al powder (Al: 50% by weight) and a Fe-Cr powder (Cr: 50% by weight) having average particle diameters of 10 mm, 20 mm and 22 mm, respectively, were compounded so as to give a composition of Fe-22Cr-5Al (% by weight). Thereto were added an organic binder (methyl cellulose), an antioxidant (oleic acid) and water to prepare a body. The body was extruded to obtain a honeycomb having square cells of 4 mil in rib thickness at a density of 400 cells/in$^2$ (cpi$^2$). The die used during extrusion was adjusted in advance at the portions corresponding to the passage wall portions "a" and "b" of the honeycomb obtained, so that the portions "a" and "b" had an increased thickness as shown in FIG. 1. Then, the honeycomb was dried, fired at 1,300° C. in a H$_2$ atmosphere, and subjected to a heat treatment at 1,000° C. in air. The resulting honeycomb structure had dimensions of 90 mm in outside diameter and 15 mm in length, a porosity of 22% and an average pore diameter of 5 μm.

On the outer periphery 10 of the honeycomb structure were set two electrodes 11 as shown in FIG. 9 to obtain a honeycomb heater. Also as shown in FIG. 9, six slits 12 of 70 mm in length (two outermost slits had a length of 50 mm) were formed in the honeycomb heater in the axial direction of passage wall so that the passage number between two adjacent slits 12 became 7 (about 10 mm).

The passage walls "a" and "b" at the front end of each slit had each a thickness of 500 μm.

The outer periphery portion 13 of each slit 12 was filled with a heat-resistant inorganic adhesive to form an insulating portion.

EXAMPLE 2

A honeycomb heater comprising a honeycomb structure was produced in the same manner as in Example 1 except that the die was adjusted in advance before extrusion so that the passages "d" and "e" were filled as shown in FIG. 2.

COMPARATIVE EXAMPLE 1

A honeycomb heater comprising a honeycomb structure was produced in the same manner as in Example 1 except that all the passage walls had the same thickness as shown in FIG. 8.

EVALUATION

Using a constant voltage supplier, each of the above produced honeycomb heaters was heated for 5 minutes so that the heater temperature (the passage temperature at the center of the heater, i.e. about the average temperature of the heater) became 800° C. in the period, after which the heater was allowed to cool for 5 minutes. This cycle of temperature increase and decrease was repeated 100 times (100 cycles) and an accelerated electrification cycle test was conducted.

As a result, neither deformation nor cell breakage occurred at the front ends of slits in the heaters of Examples 1 and 2. However, in the heater of Comparative Example, cell, breakage occurred at two places at the front ends of slits where the current density was very high.

As described above, the resistance adjusting type heater of the present invention has a property of excellent temperature elevation and a property of uniform heat generation and thereby can control heat generation and prevent abnormal heat generation at the portions of the honeycomb structure at which electricity flows at a very high density.

What is claimed is:

1. A resistance adjusting type heater comprising:
   - a honeycomb structure having a number of passages defined by passage walls;
   - at least two electrodes in electrical contact with said honeycomb structure; and
   - at least one slit extending at least partially through said honeycomb structure to alter the electrical resistance thereof, wherein a passage wall defining a front edge of said slit where said slit terminates in said honeycomb structure has an increased thickness, said edge corresponding to an area of relatively high current density.

2. The heater of claim 1, wherein a plurality passage walls surrounding said front edge have an increased thickness.

3. A resistance adjusting type heater comprising:
   - a honeycomb structure having a number of passages;
   - at least two electrodes in electrical contact with said honeycomb structure; and
   - at least one slit extending at least partially through said honeycomb structure to alter the electrical resistance thereof, wherein conductive material is disposed within a passage along a front edge of said slit where said slit terminates in said honeycomb structure, said edge corresponding to an area of relatively high current density.

4. The heater of claim 3, wherein a plurality passages surrounding said front edge are filled with conductive material.

* * * * *